United States Patent
Ji (10) Patent No.: US 11,648,941 B2
(45) Date of Patent: May 16, 2023

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Sungmin Ji, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 227 days.

(21) Appl. No.: 17/135,080

(22) Filed: Dec. 28, 2020

(65) Prior Publication Data

US 2021/0370929 A1    Dec. 2, 2021

(30) Foreign Application Priority Data

Jun. 2, 2020    (KR) .................. 10-2020-0066353

(51) Int. Cl.
| | |
|---|---|
| *B60W 30/09* | (2012.01) |
| *B60W 50/14* | (2020.01) |
| *B60W 10/18* | (2012.01) |
| *G01S 17/931* | (2020.01) |
| *G01S 17/08* | (2006.01) |
| *G06V 20/58* | (2022.01) |

(Continued)

(52) U.S. Cl.
CPC ........ *B60W 30/0956* (2013.01); *B60W 10/18* (2013.01); *B60W 30/09* (2013.01); *B60W 50/14* (2013.01); *G01S 17/08* (2013.01); *G01S 17/931* (2020.01); *G06V 20/58* (2022.01); *G06V 20/586* (2022.01); *G06V 20/588* (2022.01); *B60W 2050/143* (2013.01); *B60W 2050/146* (2013.01); *B60W 2420/52* (2013.01); *B60W 2554/80* (2020.02)

(58) Field of Classification Search
CPC .. B60W 30/0956; B60W 10/18; B60W 30/09; B60W 50/14; B60W 2554/80; B60W 2050/143; B60W 2050/146; B60W 2420/52; G01S 17/931; G01S 17/08; G06V 20/58; G06V 20/586; G06V 20/588
USPC ........................................................ 701/301
See application file for complete search history.

(56) References Cited

U.S. PATENT DOCUMENTS

| | | | | |
|---|---|---|---|---|
| 2005/0035879 A1* | 2/2005 | Gotzig | ................. | B60Q 9/006 340/932.2 |
| 2015/0179075 A1* | 6/2015 | Lee | ........................ | G08G 1/165 340/932.2 |

(Continued)

FOREIGN PATENT DOCUMENTS

| | | | | | |
|---|---|---|---|---|---|
| WO | WO-2020007235 A1 | * | 1/2020 | ........... | G01S 15/931 |

*Primary Examiner* — Elaine Gort
*Assistant Examiner* — Matthias S Weisfeld
(74) *Attorney, Agent, or Firm* — Lempia Summerfield Katz LLC (57) ABSTRACT

A vehicle includes a sensing device disposed at the vehicle so as to have an external field of view of the vehicle, configured to detect a target vehicle moving from the external field of view to a parking space and a plurality of stationary parked vehicles; a controller configured to obtain a first distance that is a width between the plurality of parked vehicles and a second distance that is a width between one parked vehicle of the plurality of parked vehicles and the target vehicle adjacent to the one parked vehicle; and a warner configured to output a warning signal based on a control command of the controller.

20 Claims, 7 Drawing Sheets

(51) Int. Cl.
     *B60W 30/095*     (2012.01)
     *G06V 20/56*     (2022.01)

(56) References Cited

U.S. PATENT DOCUMENTS

2016/0075326 A1\* 3/2016 Kiyokawa .......... B62D 15/0285
     701/41
2017/0355307 A1\* 12/2017 Ha ......................... G08G 1/143
2018/0374345 A1\* 12/2018 Suzuki ..................... G08G 1/04

\* cited by examiner

VEHICLE AND METHOD OF CONTROLLING THE SAME

CROSS-REFERENCE TO RELATED APPLICATION

The present application claims priority to and the benefit of Korean Patent Application No. 10-2020-0066353, filed on Jun. 2, 2020, the entire contents of which are incorporated herein by reference.

FIELD

The disclosure relate to a vehicle and a method of controlling the vehicle.

BACKGROUND

The statements in this section merely provide background information related to the present disclosure and may not constitute prior art.

Recently, as the number of vehicle owners has increased, road congestion as well as parking lot congestion has also increased. In addition, vehicles currently being mass-produced are equipped with an Advanced Driver Assistance System (ADAS) to prevent collisions with other vehicles in various spaces other than while driving on roads.

A risk of collision with other vehicles may occur in parking lots as well as the roads. For example, when a driver is driving in the parking lot to find a parking space, the vehicles are at risk of colliding with another vehicle exiting from a parked state or leaving the parking space for realignment.

In order to inhibit the risk of collision in the above situation, a Forward Collision-Avoidance Assist (FCA) system can be used, but this is based on a movement of an object. We have discovered that there is a limit to collision avoidance in the parking lots with space restrictions.

SUMMARY

The present disclosure provides a vehicle capable of preventing a collision with other vehicles in a parking lot, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle may include a sensing device disposed at the vehicle so as to have an external field of view of the vehicle, configured to detect a target vehicle moving from the external field of view to a parking space and a plurality of stationary parked vehicles; a controller configured to obtain a first distance that is a width between the plurality of parked vehicles and a second distance that is a width between the parked vehicle and the target vehicle adjacent to the parked vehicle; and a warner configured to output a warning signal based on a control command of the controller. In response to a difference between the first distance and the second distance being equal to or greater than a predetermined value, the controller may be configured to determine that the target vehicle is out of the parking space, and to control the warner to generate the warning signal.

The controller may be configured to obtain a plurality of first distances that are widths between the plurality of parked vehicles, to calculate a first average value that is an average of the plurality of first distances, and to control the warner to generate the warning signal based on a difference between the first average value and the second distance.

The controller may be configured to calculate the first average value of the plurality of parked vehicles between the vehicle and the target vehicle.

The sensing device may include a Light Detection And Ranging (LiDAR) installed in the vehicle to have a front field of view of the vehicle. The controller may be configured to control the LiDAR so that a LiDAR beam having a predetermined irradiation angle θ based on a driving direction of the vehicle is transmitted between a first parked vehicle and a second parked vehicle, to detect an increase amount R of the LiDAR beam, and to obtain the first distance based on the increase amount R.

The sensing device may include a camera installed on the vehicle to have a lateral field of view of the vehicle. The controller may be configured to calculate the first average value of the plurality of parked vehicles detected in the lateral field of view.

The controller may be configured to detect the parking space in which no the parked vehicle exists in the lateral field of view of the vehicle, and to exclude the first distance obtained by the parking space from the calculation of the first average value.

In response to a distance between the vehicle and the target vehicle being equal to or greater than a predetermined distance, the controller may be configured to control the warner to generate the warning signal.

The vehicle may further include a brake device configured to control an actuator according to a brake signal based on the control command of the controller. In response to a distance S between the vehicle and the target vehicle being less than a predetermined distance, the controller may be configured to generate the brake signal so that the vehicle is braked.

The controller may be configured to calculate a time to collision (TTC) between the vehicle and the target vehicle, and to control the warner to generate the warning signal in response to the TTC being lower than a predetermined threshold.

The controller may be configured to detect a side line of the parking space, to generate a virtual line perpendicular to the front of the target vehicle and the side line, to calculate an inter-angle between the side line and the virtual line, and to determine that the target vehicle is out of the parking space in response to the inter-angle being equal to or greater than a predetermined angle.

In accordance with another aspect of the disclosure, a method of controlling a vehicle may include detecting, by a sensing device, a target vehicle moving from an external field of view of the vehicle to a parking space and a plurality of stationary parked vehicles; obtaining, by a controller, a first distance that is a width between the plurality of parked vehicles and a second distance that is a width between the parked vehicle and the target vehicle adjacent to the parked vehicle; and in response to a difference between the first distance and the second distance being equal to or greater than a predetermined value, determining, by the controller, that the target vehicle is out of the parking space, and generating the warning signal.

The generating of the warning signal may include obtaining a plurality of first distances that are widths between the plurality of parked vehicles, calculating a first average value that is an average of the plurality of first distances, and generating the warning signal based on a difference between the first average value and the second distance.

The generating of the warning signal may include calculating the first average value of the plurality of parked vehicles between the vehicle and the target vehicle.

The generating of the warning signal may include controlling a Light Detection And Ranging (LiDAR) so that a LiDAR beam having a predetermined irradiation angle θ based on a driving direction of the vehicle is transmitted between a first parked vehicle and a second parked vehicle, detecting an increase amount R of the LiDAR beam, and obtaining the first distance based on the increase amount R.

The generating of the warning signal may include calculating the first average value of the plurality of parked vehicles detected in a lateral field of view of the vehicle.

The generating of the warning signal may include detecting the parking space in which no the parked vehicle exists in the lateral field of view of the vehicle, and excluding the first distance obtained by the parking space from the calculation of the first average value.

The generating of the warning signal may include, in response to a distance between the vehicle and the target vehicle being equal to or greater than a predetermined distance, controlling a warner to generate the warning signal.

The generating of the warning signal may include, in response to a distance S between the vehicle and the target vehicle being less than a predetermined distance, generating the brake signal so that the vehicle is braked.

The generating of the warning signal may include calculating a time to collision (TTC) between the vehicle and the target vehicle, and controlling a warner to generate the warning signal in response to the TTC being lower than a predetermined threshold.

In accordance with another aspect of the disclosure, a non-transitory computer readable medium containing program instructions executed by a processor, the computer readable medium may include program instructions that detect, by a sensing device, a target vehicle moving from an external field of view of the vehicle to a parking space and a plurality of stationary parked vehicles; program instructions that obtain, by a controller, a first distance that is a width between the plurality of parked vehicles and a second distance that is a width between the parked vehicle and the target vehicle adjacent to the parked vehicle; and in response to a difference between the first distance and the second distance being equal to or greater than a predetermined value, program instructions that determine, by the controller, that the target vehicle is out of the parking space, and generate the warning signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

These and/or other aspects of the disclosure will become apparent and more readily appreciated from the following description of various forms of the present disclosure, taken in conjunction with the accompanying drawings of which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and various forms of the disclosure will be described with reference to accompanying drawings.

Figure 1:
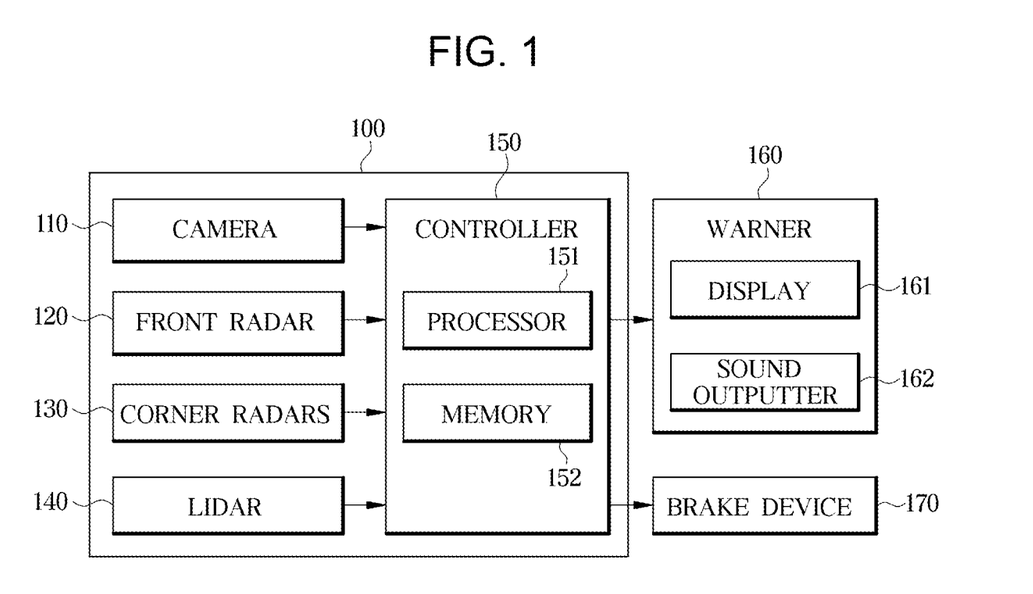
FIG. 1 is a control block diagram illustrating a vehicle according to one form of the present disclosure.
Figure 2:
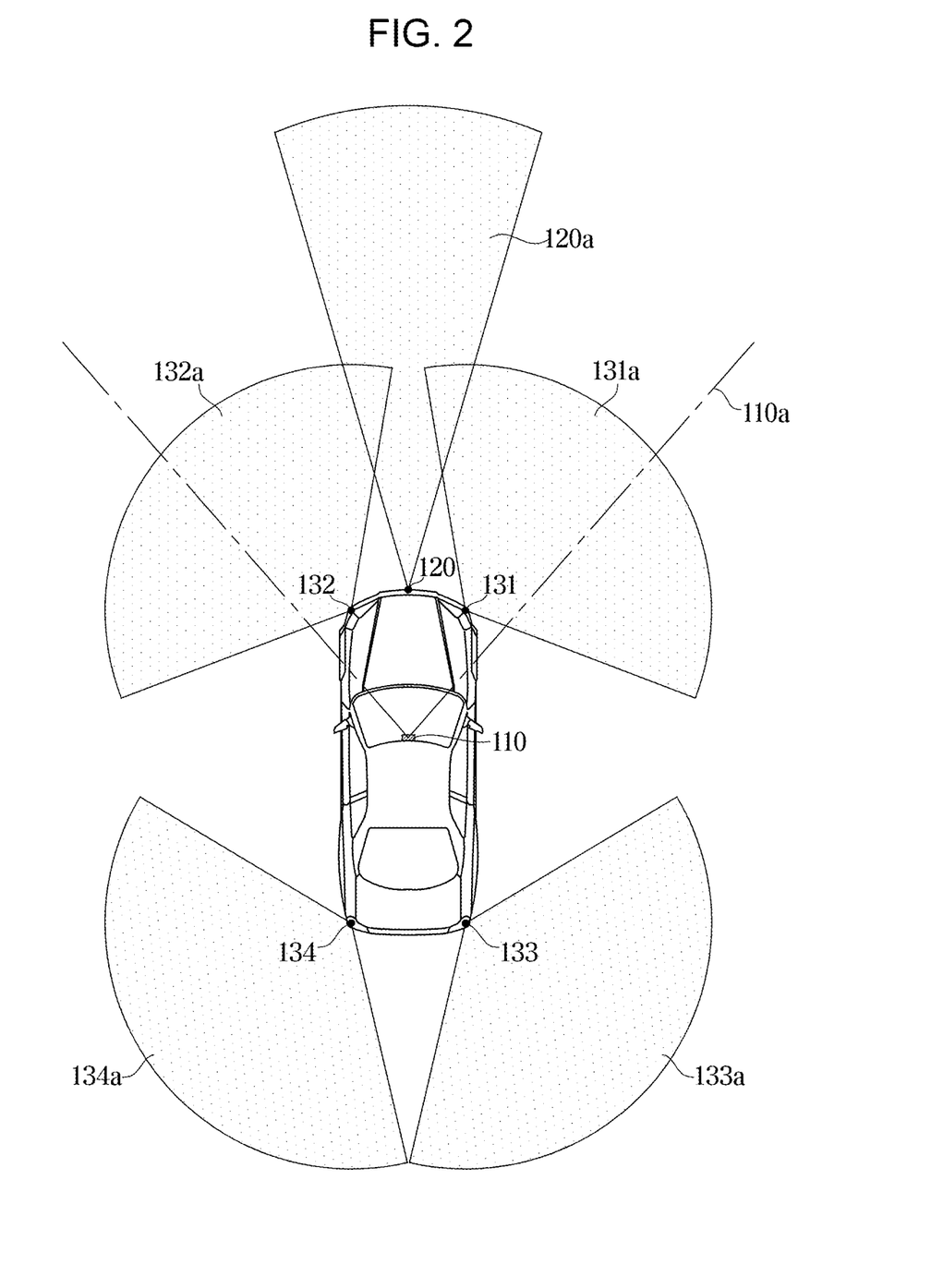
FIG. 2 is a view illustrating a detection area of a camera and a radar included in a vehicle according to one form of the present disclosure.

FIG. 1 is a control block diagram illustrating a vehicle according to one form of the present disclosure, and FIG. 2 is a view illustrating a detection area of a camera and a radar included in a vehicle according to one form of the present disclosure.

A vehicle 1 may include a collision avoidance device 100, a warner 160, and a brake device 170 for controlling an actuator. Here, the collision avoidance device 100 may be an example of a driver assistance device.

The collision avoidance device 100 may include a sensing device including at least one of a camera 110, a front radar 120, a plurality of corner radars 130 (131, 132, 133, 134), and a Light Detection And Ranging (LiDAR) 140.

The camera 110 may include a front camera configured to have a field of view 110a (see FIG. 2) directed to the front of the vehicle 1, and a lateral camera configured to have a field of view directed to the lateral side of the vehicle 1. In this case, the front camera may detect an object moving in the front view, or may detect a plurality of parked vehicles stopped in the front lateral side view.

The front camera may be installed on a front windshield of the vehicle 1. The front camera may image the front of the vehicle 1 and obtain image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The lateral camera may be installed on a B pillar side of the vehicle 1. The lateral camera may image the lateral side of the vehicle 1 and obtain image data of the lateral side of the vehicle 1. The image data regarding the front of the vehicle 1 may detect a plurality of stationary parked vehicles located on the lateral side of the vehicle 1, and may obtain distance information between the plurality of parked vehicles through an image processing process.

The camera 110 may include a plurality of lenses and an image sensor. The camera 110 may transmit the image data of an external view of the vehicle 1 to a controller 150.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may obtain front radar data from the transmission radio waves transmitted by the transmission antenna and the reflection radio waves received by the reception antenna.

The front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves. The front radar 120 may transmit the front radar data to the controller 150.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 may obtain first corner radar data, second corner radar data, third corner radar data, and fourth corner radar data, respectively.

The first corner radar data may include distance information and velocity information regarding another vehicle, a pedestrian or a cyclist (hereinafter, referred to as the obstacle) existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

The first, second, third, and fourth corner radars 131, 132, 133, and 134 may respectively transmit the first corner radar data, the second corner radar data, the third corner radar data, and the fourth corner radar data to the controller 150.

That is, the front radar 120 and the corner radars 131, 132, 133, and 134 are obstacle detectors, and may detect obstacles in the front and left and right sides of a host vehicle, and transmit obstacle information about the detected obstacle to the controller 150. Here, the obstacle information may include position information of the obstacle, and the position information of the obstacle may include distance information and direction information of the obstacle.

The LiDAR 140 may be installed on the vehicle 1 to have the external view of the vehicle 1. For example, the LiDAR 140 may be mounted on a front bumper, radiator grill, hood, roof, door, side mirror, tail gate, trunk lid, or fender.

The controller 150 may process the image data of the camera 110, the front radar data of the front radar 120, and the corner radar data of the plurality of corner radars 130, and generate a warning signal and a brake signal for controlling the warner 160 and the brake device 170.

The controller 150 may include an image signal processor, which is a processor 151 for processing the image data of the camera 110 and/or a digital signal processor for processing radar data of the radars 120 and 130 and/or a micro control unit (MCU) for generating the brake signal and/or a steering signal.

When an autonomous driving mode is performed, when image information (i.e., image data) is received from the camera 110, the controller 150 may recognize a lane of the road by performing image processing, recognize a host lane on which the host vehicle is driving based on the recognized position information of the lane. When it is determined whether both lanes of the host lane are recognized, and when it is determined that the both lanes are recognized, the controller 150 may control autonomous driving based on both recognized lanes.

When performing a collision avoidance mode, the controller 150 may identify objects in the image based on the image information obtained by the camera 110 and compare the information of the identified objects with object information stored in the memory 152 to determine whether the objects in the image are fixed or moving obstacles.

The controller 150 may detect obstacles (e.g., another vehicle, a pedestrian, a cyclist, a curb, a guard rail, a roadside tree, a street lamp, and the like) in front of the vehicle 1 based on the image data of the camera 110 and the front radar data of the front radar 120.

In detail, the controller 150 may obtain position information (distance and direction) and velocity information (relative velocity) of the obstacles in front of the vehicle 1 based on the front radar data of the front radar 120.

The controller 150 may acquire position information (direction) and type information (for example, whether the obstacle is another vehicle, a pedestrian, a cyclist, a curb, a guard rail, a roadside tree, a street lamp, or the like) of the obstacle existing in front of the vehicle 1 based on the image data of the camera 110.

The controller 150 may obtain information about a first distance, which is a width between the plurality of parked vehicles stopped at the front side and the lateral side, based on the image data of the camera 110. In addition, the controller 150 may obtain information about a second distance, which is a width between the target vehicle entering the parking space from the front side or that is likely to exit the vehicle again and the adjacent parked vehicle based on the image data of the camera 110.

In addition to the camera 110, the controller 150 may obtain information about the first distance and information about the second distance based on LiDAR data of the LiDAR 140. In this regard, it will be described later in more detail with reference to FIG. 5 below.

The controller 150 may match the obstacles detected by the image data with the obstacles detected by the front radar data, and obtain the type information, the position information, and the velocity information of the obstacles in front of the vehicle 1 based on a result of the matching.

The controller 150 may generate the brake signal and the warning signal based on the type information, the position information, and the velocity information of the front obstacles.

For example, the controller 150 may calculate a time to collision (TTC) between the vehicle 1 and the front obstacle based on the position information (relative distance) and the velocity information (relative velocity) of the front objects, and warns the driver of a collision, transmit the brake signal to the brake device 170, or transmit the warning signal to the warner 160 based on a result of comparing the TTC with a predetermined reference time.

In response to the TTC less than a predetermined first reference time, the controller 150 may allow warning to be output via audio and/or display.

In response to the TTC less than a predetermined second reference time, the controller 150 may transmit a preliminary-brake signal to the brake device 170. Here, the second reference time may be shorter than the first reference time.

That is, the controller 150 may control the operation of the warner 160 to output warning information when the TTC with the obstacle is less than the first reference time and exceeds the second reference time. When the TTC with the obstacle is less than or equal to the second reference time, the controller 150 may perform braking avoidance or steering avoidance by controlling the operation of the brake device 170 for collision avoidance control. Here, the second reference time may be shorter than the first reference time.

As another example, the controller 150 may calculate a distance to collision (DTC) based on the velocity information (e.g., relative velocity) of front objects, and warn the driver of a collision or transmit the brake signal to the brake device 170 based on a result of comparing the DTC with distances to the front objects.

When the distance to the obstacle is the first reference distance, the controller 150 may control the operation of the warner 160 to output the warning information. When the distance to the obstacle is the second reference distance, the controller 150 may control the operation of the brake device 170 for collision avoidance control. Here, the second reference distance may be shorter than the first reference distance.

The controller 150 may obtain position information (distance and direction) and velocity information (relative velocity) of the obstacles on the sides of the vehicle 1 (front right, front left, rear right, and rear left) based on corner radar data of the plurality of corner radars 130.

The controller 150 may generate the brake signal and the warning signal based on the type information, the position information, and the velocity information of the corner obstacles.

For example, the controller 150 may calculate the DTC based on the velocity information (e.g., relative velocity) of obstacles obtained by the plurality of corner radars 130, and transmit the control signal to at least one of the warner 160 and the brake device 170 based on the result of comparing the DTC with distances to the corner obstacles.

For example, the controller 150 may calculate the TTC between the vehicle 1 and the corner obstacle based on the position information (relative distance) and the velocity information (relative velocity) of the corner obstacles, and transmit an output control signal of the warning information to the warner 160 or transmit the brake signal to the brake device 170 based on the result of comparing the TTC with the predetermined reference time.

When controlling the warning information output, the controller 150 may control the operation of a warning lamp or a speaker having direction information corresponding to the direction of the obstacle.

The memory 152 may store programs and/or data for processing image data by the processor 151, programs and/or data for processing radar data by the processor 151, and programs and/or data for generating the brake signal and/or a steering signal by the processor 151.

The memory 152 may temporarily memorize the image data received from the camera 110 and/or the radar data received from the radars 120 and 130, and may temporarily memorize a result of processing the image data and/or the radar data of the processor 151.

The memory 152 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto.

The warner 160 may include a display 161 and a sound outputter 162 for outputting the warning information.

The display 161 may display the image, or may be turned on and off in response to the control command of the controller 150.

The display 161 may display information about performance and non-performance of the collision avoidance mode, and may display information about collision avoidance when the collision avoidance mode is being performed.

The display 161 may be a lamp such as a light emitting diode (LED) or a flat panel display device such as liquid crystal display (LCD).

The display 161 may include warning lamps provided on the front left and right sides of the vehicle interior, and may further include the warning lamps provided respectively on the rear left and right.

The display 161 may also display on-off information of an operation mode associated with the collision avoidance mode. At this time, the display 161 may display information about the performance of the collision avoidance mode and information about the performance of the operation mode linked to the collision avoidance mode together.

The display 161 may display the autonomous driving mode or the manual driving mode.

The sound outputter 162 may output a sound in response to the control command of the controller 150.

The sound outputter 162 may output a warning sound for preventing collision with the obstacle. The sound outputter 162 may be speakers. The speakers may be provided in the front left and right, rear left and right inside the vehicle 1.

The brake device 170 may include a braking device and a steering device that generate a braking force or a steering force according to the control command of the controller 150.

When preventing collision with the obstacle, the brake device 170 may perform braking in response to the brake signal of the controller 150. The brake device 170 may perform steering avoidance so that the vehicle 1 avoids the collision with the obstacle based on the steering signal of the controller 150.

In the above, each component of the vehicle 1 and an operation of each component have been described. Hereinafter, a control process in which the vehicle 1 preemptively detects the movement of the target vehicle in the parking lot to which the disclosure is applied will be described in detail.

Figure 3:
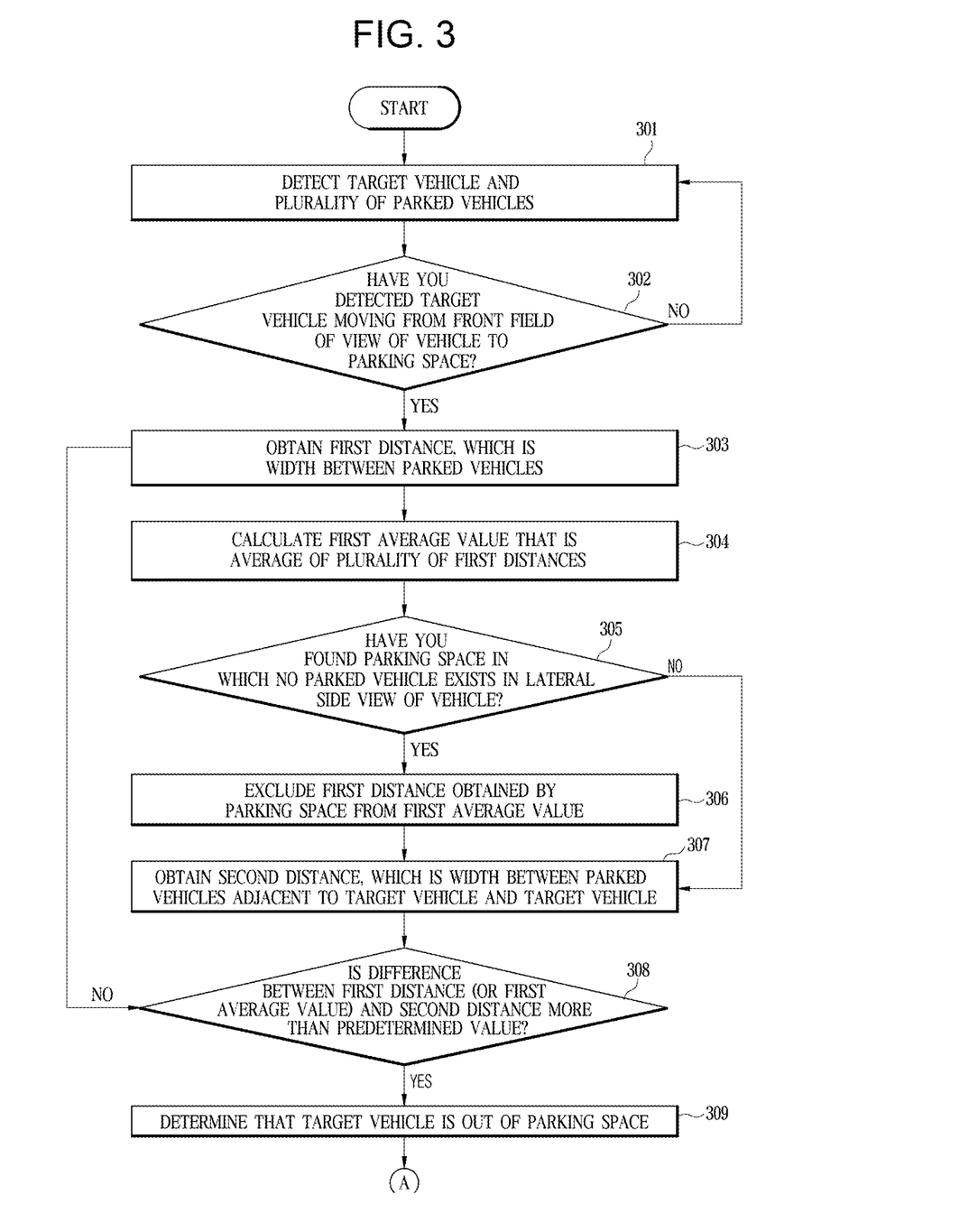
FIGS. 3 and 4 are flowcharts illustrating a method of controlling a vehicle according to one form of the present disclosure.
Figure 4:
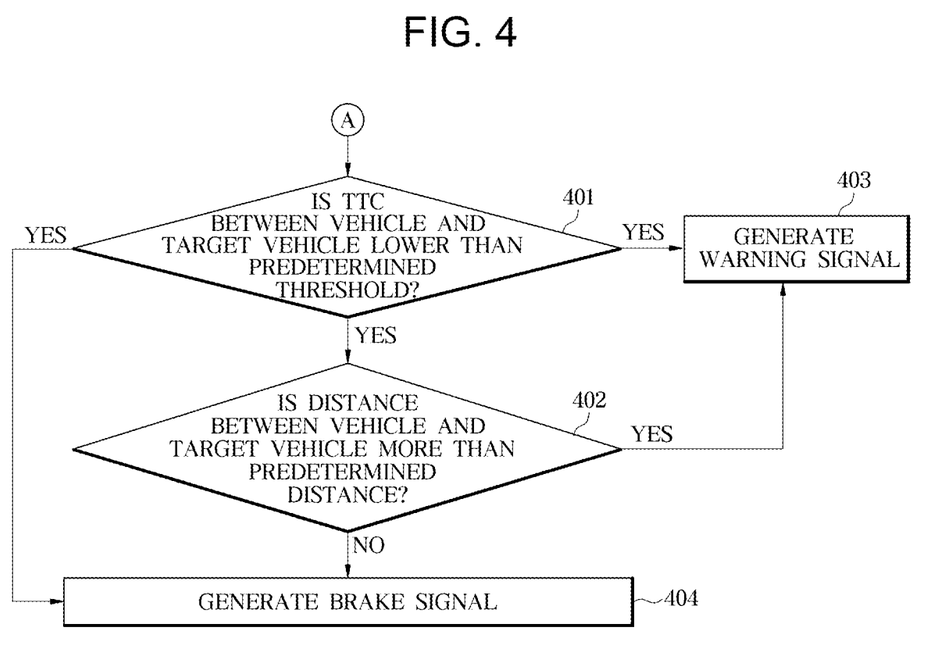

FIGS. 3 and 4 are flowcharts illustrating a method of controlling a vehicle according to one form of the present disclosure.

A control method according to FIGS. 3 to 4 will be described with reference to FIGS. 5 to 7.

First, referring to FIG. 3, a description will be given of a process in which the vehicle 1 detects the re-exit of a target vehicle 3 being parked. As illustrated in FIG. 6, it is assumed that the vehicle 1 is driving in the parking lot along the plurality of stationary parked vehicles 2-1 to 2-6, and the target vehicle 3 is parked in the parking space between the first parked vehicle 2-1 and the second parked vehicle 2-2.

The vehicle 1 may detect the target vehicle 3 and the plurality of parked vehicles 2-1 to 2-6 (301), and detect the target vehicle 3 moving from the front view of the vehicle 1 to the parking space (302).

When the vehicle 1 detects the target vehicle 3 moving to the parking space, the vehicle 1 may obtain the first distance, which is the width between the parked vehicles (303). Referring to FIG. 6, the first distance may be at least one of a separation distance d3 between the second parked vehicle 2-2 and the third parked vehicle 2-3, a separation distance d2 between the third parked vehicle 2-3 and the fourth parked vehicle 2-4, and a separation distance d1 between the fourth parking vehicle 2-4 and the fifth parking vehicle 2-5.

As described above, the first distance may be obtained based on the image data obtained by the camera 110 mounted on the vehicle 1. Also, the first distance may be obtained based on the LiDAR data obtained by the LiDAR 140 mounted on the vehicle 1.

Figure 5:
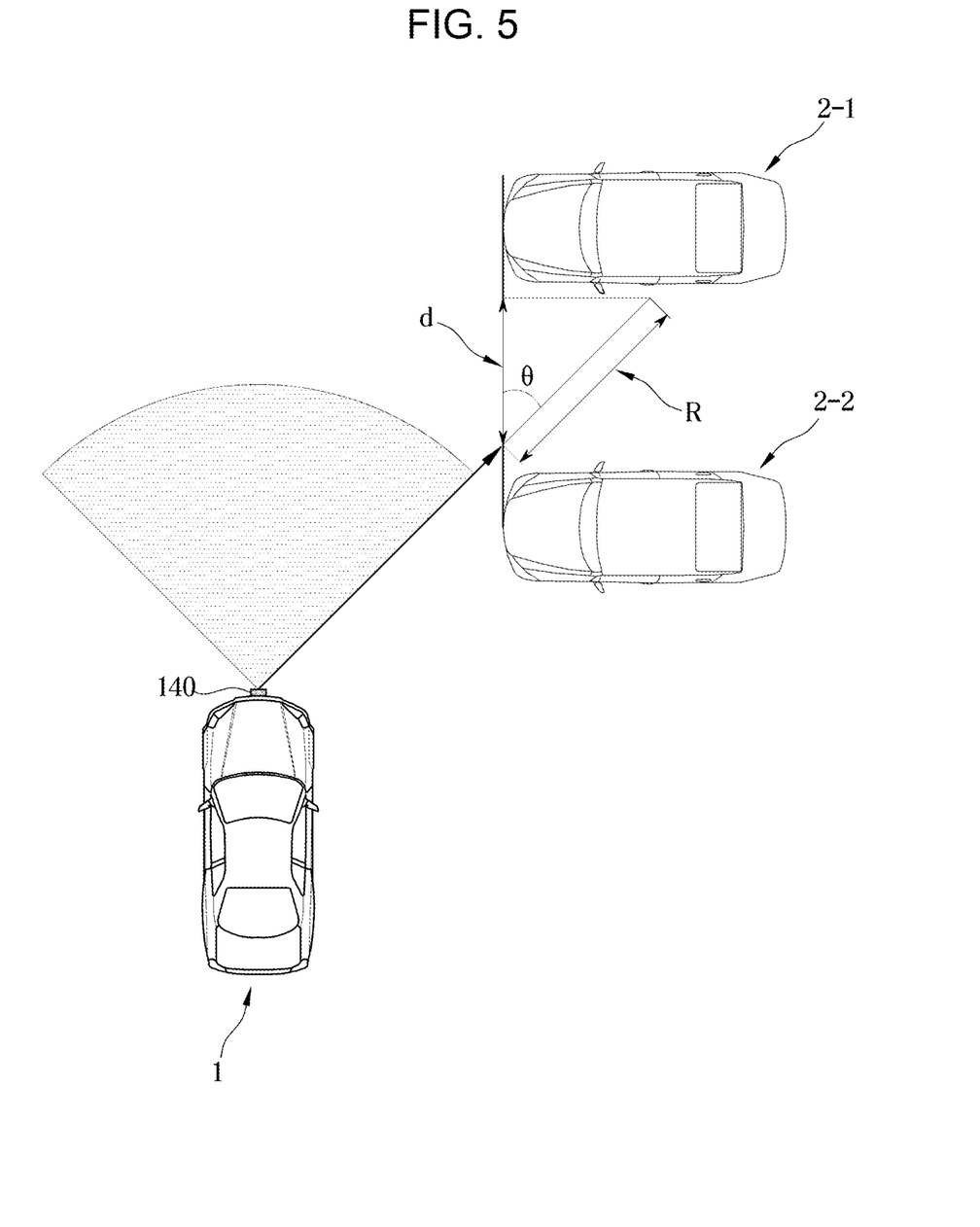
FIG. 5 is a view for describing calculation of a distance between parked vehicles.

Referring to FIG. 5, the LiDAR 140 may transmit and receive a LiDAR beam having a predetermined irradiation angle θ based on the driving direction of the vehicle 1. The LiDAR 140 may implement a 3D image by transmitting and receiving a plurality of LiDAR beams having different irradiation angles. At this time, when the vehicle 1 knows the predetermined irradiation angle θ of the LiDAR beam and a distance increase R of the LiDAR beam transmitted and received from the LiDAR 140, the vehicle 1 may obtain a first distance d between the parked vehicles in the front side of the vehicle 1 according to Equation 1 below.

$$d = R \times \cos\theta \qquad \text{[Equation 1]}$$

Based on the above-described method, the vehicle 1 may obtain at least one first distance between the vehicle 1 and the target vehicle 3. For example, the vehicle 1 may obtain all of the plurality of first distances detected in the front view while driving toward the target vehicle 3. In addition, the vehicle 1 may obtain the first distance between parked vehicles in a lateral side view of the vehicle 1 based on the image data obtained by the camera 110 installed on the side of the vehicle 1.

When the vehicle 1 obtains a plurality of first distances, the vehicle 1 may calculate a first average value dp that is an average of the plurality of first distances (304). The first average value dp may be calculated according to Equation 2 below.

$$\frac{d_1 + d_2 + d_3 + \ldots}{n} = d_P \qquad \text{[Equation 2]}$$

Figure 6:
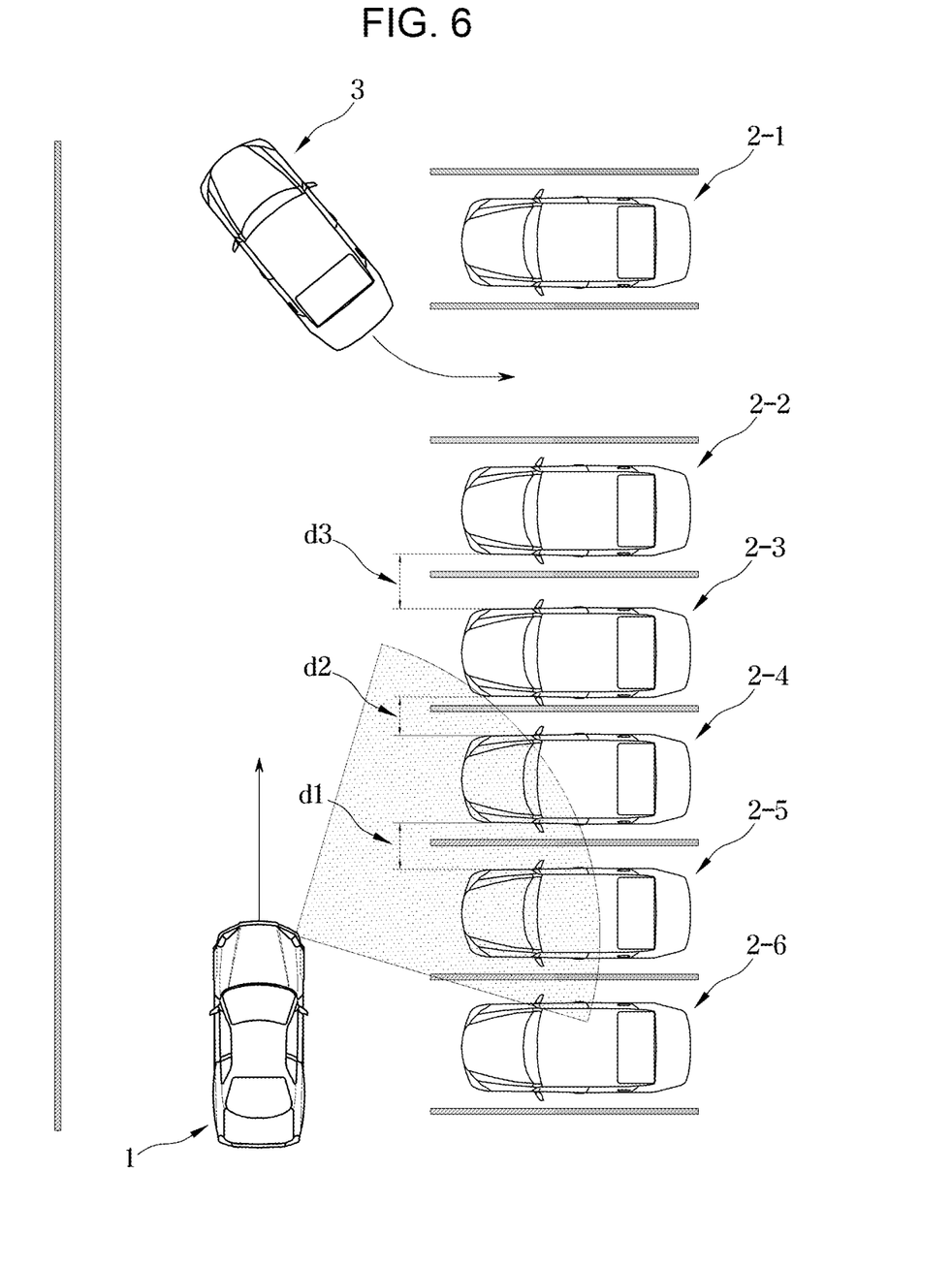
FIG. 6 is a view for describing calculation of an average distance value between parked vehicles.
Figure 7:
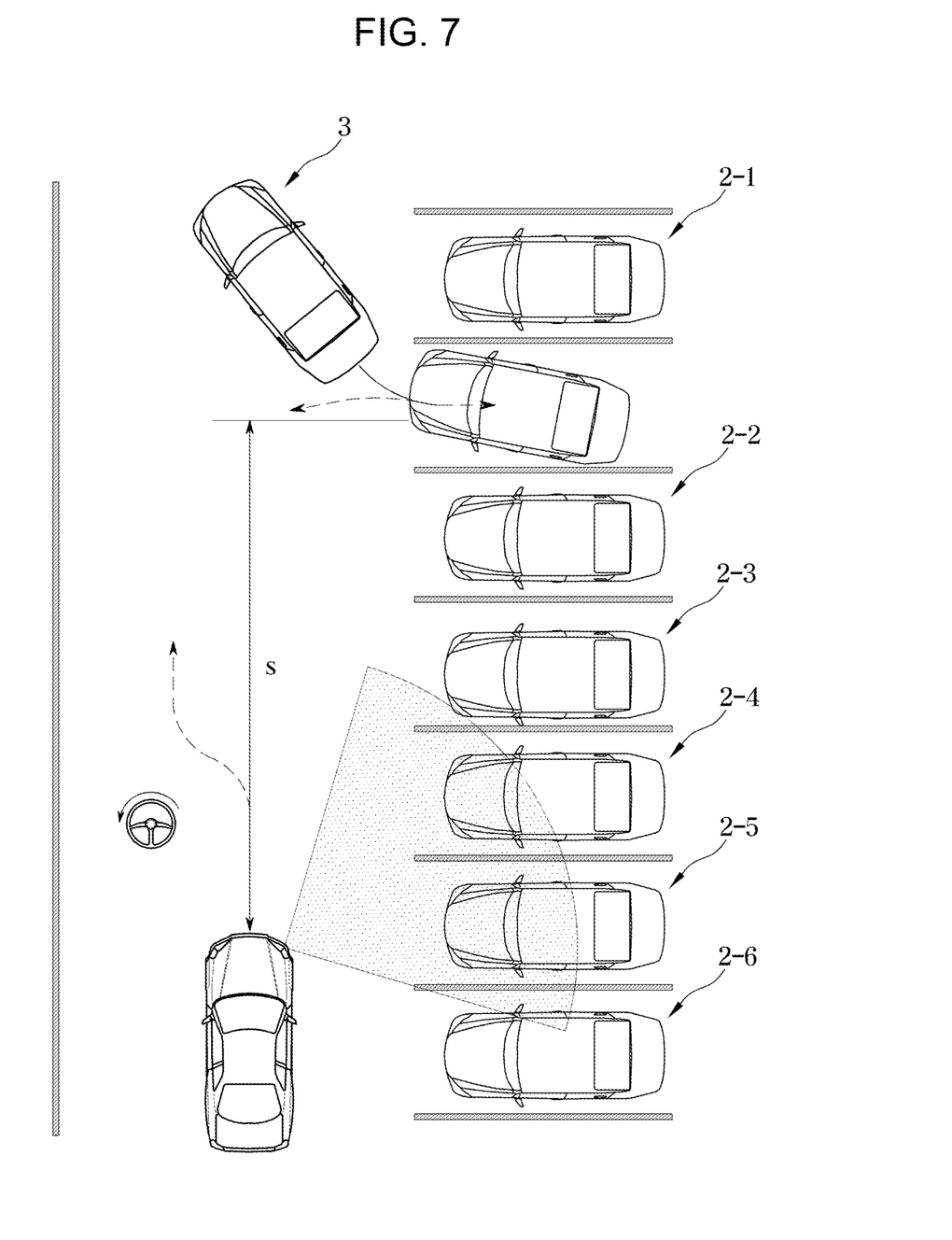
FIG. 7 is a view for describing collision avoidance of a vehicle according to one form of the present disclosure.

For example, unlike illustrated in FIG. 6, when at least one of the second parked vehicle 2-2 to the sixth parked vehicle 2-6 does not exist, the vehicle 1 may reflect this in the calculation of the first average value dp. When the vehicle 1 finds the parking space in which no parked vehicle exists in the lateral side view of the vehicle 1 (305), the vehicle 1 may exclude the first distance obtained by the parking space from the calculation of the first average value dp (306). For example, when the vehicle 1 has the first distance having a value higher than an overall width of a typical vehicle among the plurality of first distances, the vehicle 1 may be excluded from calculating the average value dp.

When the first distance or the first average value is calculated in the above process, the vehicle 1 may obtain the second distance, which is the width between the parked vehicles 2-1 and 2-2 adjacent to the target vehicle 3 and the target vehicle 3 (307). Particularly, when the target vehicle 3 first attempts to enter the parking space and enters the parking space by a predetermined distance or parallel to another parked vehicle, the vehicle 2 may obtain the second distance. In this case, the second distance may also be obtained in the same manner as the first distance. In addition, the second distance may be the separation distance detected by either the left side or the right side of the target vehicle 3.

When the vehicle 1 obtains the first distance (or the first average value) and the second distance, the vehicle 1 may compare whether a difference between the first distance and the second distance is greater than or equal to a predetermined value (308). For example, when the driver of the target vehicle 3 first enters the parking space and the target vehicle 3 is skewed to the left or right, the driver may attempt to re-exit for rearrangement. At this time, when the target vehicle 3 re-exits from the parking space, there is a possibility of the collision with the vehicle 1 being driven. In the disclosure, it is possible to predict whether or not the target vehicle 3 for which parking has not been completed is re-exited through the average of the parking intervals of the already parked vehicles.

The vehicle 1 may determine that the target vehicle 3 is out of the parking space when a difference value is greater than or equal to a predetermined value as a result of comparing the first distance (or the first average value) and the second distance (309). Unlike an existing Forward Collision-Avoidance Assist (FCA), there is no need to determine the movement of the target vehicle 3, and it is possible to preemptively identify the risk of the collision before the target vehicle 3 suddenly re-exits.

In addition to the above-described method, according to the one form of the present disclosure, the vehicle 1 may detect a side line of the parking space (a direction parallel to the side of the parked vehicle), generate a virtual line perpendicular to the front of the target vehicle 3, and predict that the target vehicle 3 leaves the parking space based on an inter-angle between the side line and the virtual line. In this case, when the inter-angle is greater than or equal to the predetermined angle, the vehicle 1 may determine that the target vehicle 3 will leave the parking space and re-exit. This is considering that the driver of the target vehicle 3 re-exits the vehicle to rearrange when the target vehicle 3 fails to enter the parking space side by side.

Referring to FIG. 4, when it is determined that the target vehicle 3 is to be exited again, the vehicle 1 may generate the warning signal or the brake signal to prevent the collision with the target vehicle 3.

Particularly, when the TTC between the vehicle 1 and the target vehicle 3 is lower than a predetermined threshold (401), the vehicle 1 may transmit the warning signal to the warner 160 to output the warning to the driver through audio and/or display (403). In this case, the predetermined threshold value may be based on the first reference time.

In addition, when the collision prediction time between the vehicle 1 and the target vehicle 3 is lower than the predetermined threshold (401), the vehicle 1 may perform braking avoidance by controlling the operation of the brake device 170 to avoid the collision of the target vehicle 3 (404). In addition, the vehicle 1 may perform steering avoidance. In this case, the predetermined threshold value is a second reference time, wherein the second reference time is shorter than the first reference time, and corresponds to a case where immediate avoidance is required than the case of the first reference time.

Additionally, the vehicle 1 may select either the warning or the braking control based on the distance between the vehicle 1 and the target vehicle 3.

When a distance s between the vehicle 1 and the target vehicle 3 (see FIG. 7) is greater than or equal to the predetermined distance (402), the vehicle 1 may transmit the warning signal to the warner 160 to output the warning to the driver through the audio and/or the display, seeing that the driver has a sufficient opportunity to avoid the collision (403).

Conversely, when the distance between the vehicle 1 and the target vehicle 3 is less than the predetermined distance (402), the vehicle 1 may perform the braking avoidance by controlling the operation of the brake device 170 to avoid the collision of the target vehicle 3 (404). Also, the vehicle 1 may perform the steering avoidance.

According to one form of the present disclosure, it is possible to inhibit the collision with unexpectedly exiting vehicles or re-exiting vehicles in the parking lot.

The disclosed forms may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Various forms of the disclosure have thus far been described with reference to the accompanying drawings. It should be apparent to those of ordinary skill in the art that the disclosure may be practiced in other forms than the forms as described above without changing the technical idea or essential features of the disclosure. The above forms are only by way of example, and should not be interpreted in a limited sense.

What is claimed is:

1. A vehicle comprising:
   a sensing device disposed at the vehicle, and configured to have an external field of view of the vehicle and detect a target vehicle moving from the external field of view to a parking space and a plurality of stationary parked vehicles;
   a controller configured to obtain a first distance that is a width between the plurality of parked vehicles and a second distance that is a width between one parked vehicle of the plurality of parked vehicles and the target vehicle adjacent to the one parked vehicle; and
   a warner configured to output a warning signal based on a control command of the controller,
   wherein, when a difference between the first distance and the second distance is equal to or greater than a predetermined value, the controller determines that the target vehicle is out of the parking space and controls the warner to generate the warning signal.

2. The vehicle according to claim 1, wherein the controller is configured to obtain a plurality of first distances that are widths between the plurality of parked vehicles, calculate a first average value that is an average of the plurality of first distances, and control the warner to generate the warning signal based on a difference between the first average value and the second distance.

3. The vehicle according to claim 2, wherein the controller is configured to calculate the first average value of the plurality of parked vehicles between the vehicle and the target vehicle.

4. The vehicle according to claim 2, wherein:
the sensing device comprises a Light Detection And Ranging (LiDAR) installed in the vehicle and configured to provide a front field of view of the vehicle; and
the controller is configured to:
control the LiDAR so that a LiDAR beam having a predetermined irradiation angle θ based on a driving direction of the vehicle is transmitted between a first parked vehicle and a second parked vehicle,
detect an increase amount R of the LiDAR beam, and obtain the first distance based on the increase amount R.

5. The vehicle according to claim 2, wherein:
the sensing device comprises a camera installed on the vehicle, wherein the camera is configured to provide a lateral field of view of the vehicle, and
the controller is configured to calculate the first average value of the plurality of parked vehicles detected in the lateral field of view.

6. The vehicle according to claim 2, wherein the controller is configured to detect the parking space in which no parked vehicle exists in the lateral field of view of the vehicle, and to exclude the first distance obtained by the parking space from the calculation of the first average value.

7. The vehicle according to claim 2, wherein, when a distance between the vehicle and the target vehicle is equal to or greater than a predetermined distance, the controller is configured to control the warner to generate the warning signal.

8. The vehicle according to claim 2, further comprising:
a brake device configured to control an actuator according to a brake signal based on the control command of the controller,
wherein, when a distance between the vehicle and the target vehicle is less than a predetermined distance, the controller generates the brake signal so that the vehicle is braked.

9. The vehicle according to claim 1, wherein the controller is configured to calculate a time to collision (TTC) between the vehicle and the target vehicle, and control the warner to generate the warning signal when the TTC is lower than a predetermined threshold.

10. The vehicle according to claim 1, wherein the controller is configured to:
detect a side line of the parking space,
generate a virtual line perpendicular to a front of the target vehicle and the side line,
calculate an inter-angle between the side line and the virtual line, and
determine that the target vehicle is out of the parking space when the inter-angle is equal to or greater than a predetermined angle.

11. A method of controlling a vehicle comprising:
detecting, by a sensing device, a target vehicle moving from an external field of view of the vehicle to a parking space and a plurality of stationary parked vehicles;
obtaining, by a controller, a first distance that is a width between the plurality of parked vehicles and a second distance that is a width between one parked vehicle of the plurality of the parked vehicles and the target vehicle adjacent to the parked vehicle; and
when a difference between the first distance and the second distance is equal to or greater than a predetermined value, determining, by the controller, that the target vehicle is out of the parking space, and generating a warning signal.

12. The method according to claim 11, wherein generating of the warning signal comprises:
obtaining a plurality of first distances that are widths between the plurality of parked vehicles;
calculating a first average value that is an average of the plurality of first distances; and
generating the warning signal based on a difference between the first average value and the second distance.

13. The method according to claim 12, wherein generating of the warning signal comprises:
calculating the first average value of the plurality of parked vehicles between the vehicle and the target vehicle.

14. The method according to claim 12, wherein generating of the warning signal comprises:
controlling a Light Detection And Ranging (LiDAR) so that a LiDAR beam having a predetermined irradiation angle θ based on a driving direction of the vehicle is transmitted between a first parked vehicle and a second parked vehicle;
detecting an increase amount R of the LiDAR beam; and
obtaining the first distance based on the increase amount R.

15. The method according to claim 12, wherein generating of the warning signal comprises:
calculating the first average value of the plurality of parked vehicles detected in a lateral field of view of the vehicle.

16. The method according to claim 12, wherein generating of the warning signal comprises:
detecting the parking space in which no parked vehicle exists in the lateral field of view of the vehicle; and
excluding the first distance obtained by the parking space from the calculation of the first average value.

17. The method according to claim 12, wherein generating of the warning signal comprises:
when a distance between the vehicle and the target vehicle is equal to or greater than a predetermined distance, controlling a warner to generate the warning signal.

18. The method according to claim 12, wherein generating of the warning signal comprises:
when a distance between the vehicle and the target vehicle is less than a predetermined distance, generating the brake signal so that the vehicle is braked.

19. The method according to claim 11, wherein generating of the warning signal comprises:
calculating a time to collision (TTC) between the vehicle and the target vehicle; and
controlling a warner to generate the warning signal when the TTC is lower than a predetermined threshold.

20. A non-transitory computer readable medium containing program instructions executed by a processor, the computer readable medium comprising:
program instructions that detect, by a sensing device, a target vehicle moving from an external field of view of the vehicle to a parking space and a plurality of stationary parked vehicles;
program instructions that obtain, by a controller, a first distance that is a width between the plurality of parked vehicles and a second distance that is a width between one parked vehicle of the plurality of parked vehicles and the target vehicle adjacent to the one parked vehicle; and when a difference between the first distance and the second distance is equal to or greater than a predetermined value, program instructions that determine, by the controller, that the target vehicle is out of the parking space, and generate a warning signal.

* * * * *